(12) United States Patent
Jones et al.

(10) Patent No.: US 9,898,638 B2
(45) Date of Patent: Feb. 20, 2018

(54) OPTICAL MARKER FOR DELIVERY DRONE CARGO DELIVERY

(71) Applicant: International Business Machines Corporation, Armonk, NY (US)

(72) Inventors: Gregory S. Jones, Lewisville, TX (US); John S. Pannell, Keller, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/004,142

(22) Filed: Jan. 22, 2016

(65) Prior Publication Data

US 2017/0213062 A1     Jul. 27, 2017

(51) Int. Cl.
  *G06K 9/00*     (2006.01)
  *G06K 7/14*     (2006.01)
  *G06K 9/20*     (2006.01)

(52) U.S. Cl.
  CPC ....... *G06K 7/1417* (2013.01); *G06K 9/00469* (2013.01); *G06K 9/2063* (2013.01); *G06K 2209/01* (2013.01)

(58) Field of Classification Search
  None
  See application file for complete search history.

(56) References Cited

U.S. PATENT DOCUMENTS

| | | | |
|---|---|---|---|
| 7,035,856 B1* | 4/2006 | Morimoto | B65D 5/4212 705/7.12 |
| 8,576,064 B1* | 11/2013 | Mitchell | H04L 67/36 340/539.1 |
| 8,909,391 B1* | 12/2014 | Peeters | G05D 1/0027 701/2 |
| 9,412,280 B1* | 8/2016 | Zwillinger | G08G 5/0069 |
| 2004/0249519 A1* | 12/2004 | Frink | B64D 45/0015 701/3 |
| 2010/0234995 A1* | 9/2010 | Zini | G05B 19/41895 700/258 |

(Continued)

OTHER PUBLICATIONS

Haque et al, Autonomous Quadcopter for Product Home Delivery, International Conference on Electrical Engineering and Information & Communication Technology (ICEEICT) 2014.*

*Primary Examiner* — Andrae S Allison
(74) *Attorney, Agent, or Firm* — Cuenot, Forsythe & Kim, LLC

(57) ABSTRACT

At least one image captured by an image capture device of a delivery drone can be processed to identify at least one optical marker contained in the image. The optical marker can display at least one machine readable optical label, or alphanumeric characters, indicating a cargo recipient. Responsive to identifying the optical marker, image processing on the image can be performed to generate data corresponding to the machine readable optical label or alphanumeric characters. Whether the data corresponds to an intended cargo recipient of a cargo being carried by the delivery drone can be determined. Responsive to determining that the data corresponding to the machine readable optical label or alphanumeric characters corresponds to the intended cargo recipient of the cargo being carried by the delivery drone, the delivery drone can be initiated to deliver the cargo at a specific location indicated by the optical marker.

18 Claims, 6 Drawing Sheets

(56) References Cited

U.S. PATENT DOCUMENTS

| | | | |
|---|---|---|---|
| 2011/0084162 A1* | 4/2011 | Goossen | B64C 39/024 244/12.1 |
| 2011/0264311 A1* | 10/2011 | Lee | H04N 7/183 701/15 |
| 2014/0032034 A1* | 1/2014 | Raptopoulos | G08G 5/0069 701/25 |
| 2014/0163775 A1* | 6/2014 | Metzler | G01C 15/002 701/2 |
| 2014/0164126 A1* | 6/2014 | Nicholas | A63F 9/24 705/14.58 |
| 2014/0204360 A1* | 7/2014 | Dowski, Jr. | G05D 1/101 356/4.01 |
| 2014/0254896 A1 | 9/2014 | Zhou et al. | |
| 2015/0317597 A1* | 11/2015 | Shucker | G06Q 10/083 235/375 |

* cited by examiner

OPTICAL MARKER FOR DELIVERY DRONE CARGO DELIVERY

BACKGROUND

The present invention relates to parcel delivery, and more specifically, to delivering cargo using a delivery drone.

A delivery drone, also known as a parcelcopter, is an unmanned aerial vehicle (UAV) utilized to transport cargo, such as a package. Cargo may include one or more items, such as food, medicine or other goods. Delivery drones offer certain advantages over conventional parcel delivery. For example, delivery zones fly, and thus are not affected by traffic congestion. Thus, a delivery drone oftentimes can deliver cargo more quickly than conventional parcel delivery. Also, use of autonomous delivery drones is expected to reduce costs for parcel delivery companies. In illustration, delivery drones may require less maintenance than a conventional vehicle, may require less energy to operate, and autonomous delivery drones do not require a delivery driver.

SUMMARY

A method includes processing at least one image captured by an image capture device of a delivery drone to identify at least one optical marker contained in the image, the optical marker displaying at least one machine readable optical label, or alphanumeric characters, indicating a cargo recipient. The method also can include, responsive to identifying the optical marker contained in the image, performing, using a processor, image processing on the image to generate data corresponding to the machine readable optical label or alphanumeric characters. The method also can include determining whether the data corresponding to the machine readable optical label or alphanumeric characters corresponds to an intended cargo recipient of a cargo being carried by the delivery drone. The method also can include, responsive to determining that the data corresponding to the machine readable optical label or alphanumeric characters corresponds to the intended cargo recipient of the cargo being carried by the delivery drone, initiating the delivery drone to deliver the cargo at a specific location indicated by the optical marker.

A system includes a processor programmed to initiate executable operations. The executable operations include processing at least one image captured by an image capture device of a delivery drone to identify at least one optical marker contained in the image, the optical marker displaying at least one machine readable optical label, or alphanumeric characters, indicating a cargo recipient. The executable operations also can include, responsive to identifying the optical marker contained in the image, performing image processing on the image to generate data corresponding to the machine readable optical label or alphanumeric characters. The executable operations also can include determining whether the data corresponding to the machine readable optical label or alphanumeric characters corresponds to an intended cargo recipient of a cargo being carried by the delivery drone. The executable operations also can include, responsive to determining that the data corresponding to the machine readable optical label or alphanumeric characters corresponds to the intended cargo recipient of the cargo being carried by the delivery drone, initiating the delivery drone to deliver the cargo at a specific location indicated by the optical marker.

A computer program includes a computer readable storage medium having program code stored thereon. The program code is executable by a processor to perform a method. The method includes processing, by the processor, at least one image captured by an image capture device of a delivery drone to identify at least one optical marker contained in the image, the optical marker displaying at least one machine readable optical label, or alphanumeric characters, indicating a cargo recipient. The method also can include, responsive to identifying the optical marker contained in the image, performing, by the processor, image processing on the image to generate data corresponding to the machine readable optical label or alphanumeric characters. The method also can include determining whether the data corresponding to the machine readable optical label or alphanumeric characters corresponds to an intended cargo recipient of a cargo being carried by the delivery drone. The method also can include, responsive to determining that the data corresponding to the machine readable optical label or alphanumeric characters corresponds to the intended cargo recipient of the cargo being carried by the delivery drone, initiating, by the processor, the delivery drone to deliver the cargo at a specific location indicated by the optical marker.

DETAILED DESCRIPTION

Figure 1:
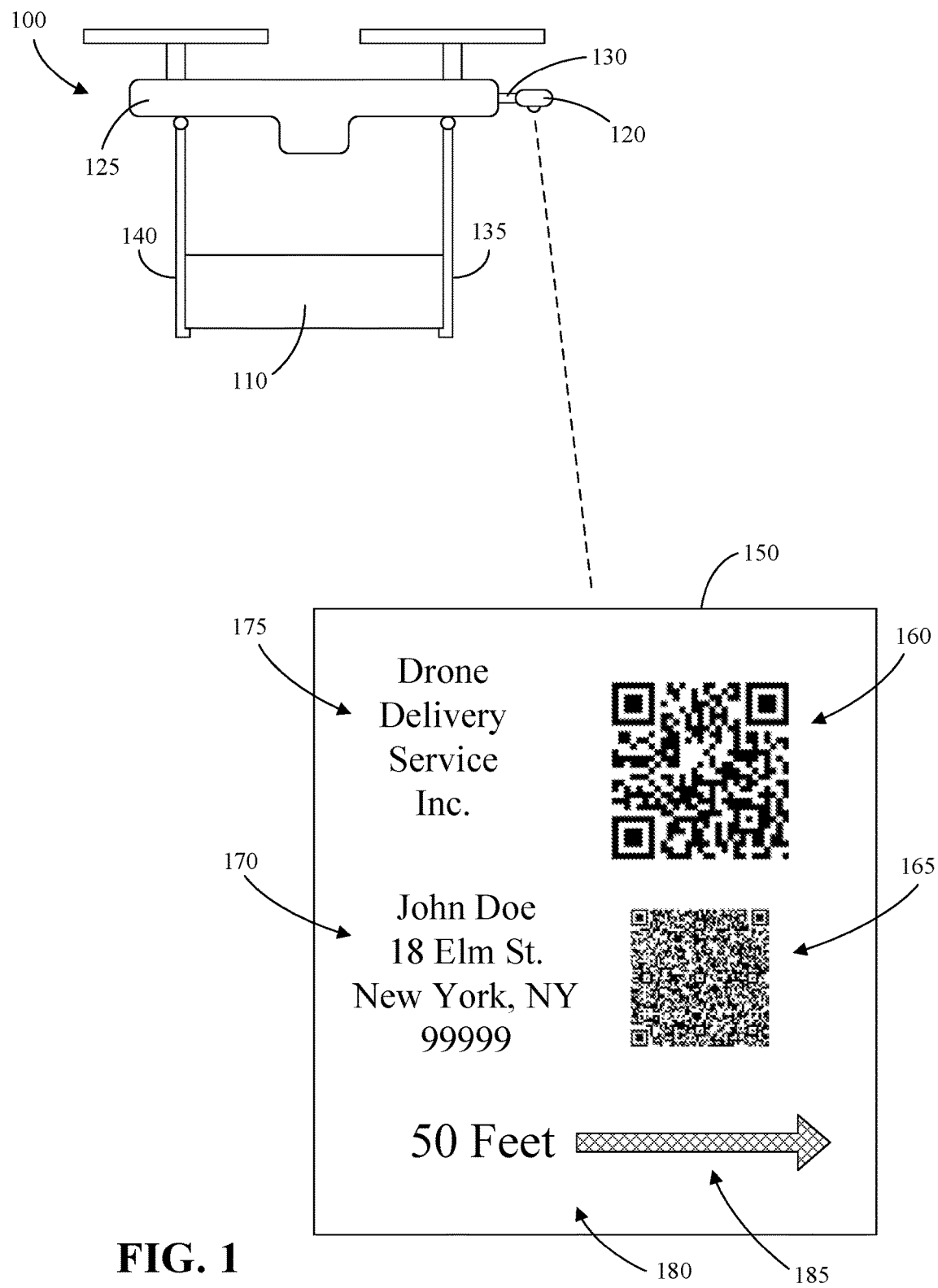
FIG. 1 is a pictorial diagram illustrating an example of a delivery drone delivering cargo.

This disclosure relates to parcel delivery, and more specifically, to delivering packages using a delivery drone. In accordance with the inventive arrangements disclosed herein, an optical marker can be displayed at a general location to which cargo is to be delivered. The general location can be, for example, a property identified by an address and/or global positioning system (GPS) coordinates. The optical marker can display one or more machine readable optical labels (e.g., quick response (QR) codes or bar codes) and/or alphanumeric characters indicating a cargo recipient, for example the name of a person, business or organization.

A delivery drone carrying the cargo to the location, for example using a GPS receiver and/or maps to find the location. After arriving at the general location, the delivery drone can identify the optical marker and capture an image of it. The delivery drone, or a processing system to which the delivery drone is communicatively linked, can process the image to identify the cargo recipient indicated by the machine readable optical label or alphanumeric characters. Further, the delivery drone, or processing system, can determine whether that cargo recipient is an intended recipient of the cargo. If so, the delivery drone can deliver the cargo within a predetermined distance from the optical marker or at a location indicated by the optical marker. If the cargo recipient is not the intended recipient of the cargo, the delivery drone can search for additional optical markers. If an optical marker that identifies the intended recipient is not found, the drone need not deliver the cargo.

Several definitions that apply throughout this document now will be presented.

As defined herein, the term "delivery drone" means is an unmanned aerial vehicle (UAV) utilized to transport cargo.

As defined herein, the term "cargo" means at least one physical item that is delivered to a physical location using some means of transportation.

As defined herein, the term "general location" means a location specified by an address or geographic coordinates (e.g., latitude and longitude). For example, a "general location" can be a property (e.g., a piece of land, a structure on a piece of land, or a portion of a structure on a piece of land) identified by an address or geographic coordinates. In another example, a "general location" can be a ship, a truck, or the like, which may be still or moving. In the case that the "general location" is a truck or ship that is moving, the geographic coordinates can be continually updated to correspond with the movement.

As defined herein, the term "specific location" means a particular area at a general location. For example, a specific location can be an area where cargo addressed to a cargo recipient associated with the general location is received (e.g., a delivery receiving dock, a porch, etc.).

As defined herein, the term "machine readable optical label" means a label physically printed on, or physically attached to, an optical marker. Examples of a "machine readable optical label" include, but are not limited to, a bar code and a quick response (QR) code. A reflection of light, per se, generated by projection of laser light onto a target is not a "machine readable optical label" as the term "machine readable optical label" is defined herein.

As defined herein, the term "optical marker" means a physical structure comprising at least one machine readable optical label. Such physical structure may be made of one or more materials. Examples of such materials include, but are not limited to, metal, plastic, paper, etc.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

FIG. 1 is a pictorial diagram illustrating an example of a delivery drone 100 delivering cargo 110. The delivery drone 100 can include at least one image capture device 120 (e.g., a video camera or still image camera) configured to capture images, for example an image of an optical marker 150, or at least a portion of the optical marker 150. Optionally, the image capture device 120 also can provide a video stream to a remote pilot or system to facilitate piloting of the delivery drone 100.

In one arrangement, the image capture device 120 can be fixed to the delivery drone 100 in a particular orientation with respect to the delivery drone 100 (e.g., pointing downward or at a particular angle with respect to horizontal). For example, the image capture device can be attached to a body of 125 of the delivery drone 100 by a support bracket 130 that positions the image capture device 120 to have a clear view of the optical marker 150 unimpeded by the cargo 110.

In another arrangement, the image capture device 120 can be movably and/or pivotally attached to the delivery drone 100 to allow the image capture device 120 to be selectively oriented to point in a desired direction relative to the delivery drone 100. In illustration, the image capture device 120 can be attached to the support bracket 130 using a swivel that allows the image capture device 120 to be rotated horizontally and/or vertically with respect to the delivery drone 100. In such an arrangement, an actuator can be included in the support bracket 130 or the image capture device 120 to selectively control the orientation of the image capture device 120 with respect to the delivery drone 100, and thus the direction in which the image capture device 120 captures images.

The delivery drone 100 also can include cargo support members 135, 140, which may be hingedly attached to the delivery drone 100. The cargo support members 135, 140 can be configured to be operated by the delivery drone 100 to grab onto cargo 110 and hold the cargo 110 until released by the delivery drone 100, for example at a delivery specific location indicated by the optical marker 150. In this regard, the delivery drone 100 can include one or more actuators to control positioning of the cargo support members 135, 140 in order to grab onto the cargo 110 and release the cargo 110 when appropriate to do so.

The optical marker 150 can include or more machine readable optical labels (hereinafter "optical labels") 160, 165 (e.g., QR codes or bar codes) and/or alphanumeric characters 170. The optical label 160 and/or alphanumeric characters 170 can indicate a particular cargo recipient, such as a person, business or organization, or a unique identifier assigned to the particular cargo recipient. The optical label 165 (or alphanumeric characters—not shown) can identify a unique shipment of cargo, for example a unique tracking number or other unique identifier assigned to the cargo delivery, which also can be unique to the particular cargo recipient. Optionally, the optical marker 150 can include alphanumeric characters and/or symbols 175 indicating a particular cargo service.

By way of example, a particular cargo recipient may desire to receive all cargo at the same location. In such case, the optical marker 150 can include the optical label 160, but need not include the optical label 165. If a particular cargo recipient desires to receive different cargo deliveries at different specific locations (e.g., at different cargo receiving docks), the optical marker 150 can include the optical label 165 pertaining to delivery of the specific cargo 110. In such case, the optical label 160 still can be provided, but this need not be the case since the optical label 165 can be associated with the cargo recipient, for example based on a cargo tracking number or other unique identifier.

In a further arrangement, the optical marker 150 can include one or more alphanumeric characters and/or symbols 180, 185 indicating a specific location where cargo is to be delivered, for instance with respect to a location of the optical marker 150. By way of example, the alphanumeric characters and/or symbols 180 can indicate that the cargo 110 is to be delivered at a distance of 50 feet from the marker at a compass heading of 180 degrees or in a direction indicated by the symbol 185 (e.g., an arrow). In addition to, or in lieu of, the alphanumeric characters and/or symbols 180, 185, the specific location where cargo is to be delivered can be encoded into the optical label 160 and/or the optical label 165, or encoded in another optical label (not shown) included on the optical marker 150.

In one arrangement, one or more of the optical labels 160, 165 and/or alphanumeric characters/symbols 170-185 can be configured to be visible in an infrared and/or ultraviolet light spectrum. In such an arrangement, the image capture device 120 can be configured to detect images in the infrared and/or ultraviolet light spectrum. For instance, the optical labels 160, 165 and/or alphanumeric characters/symbols 170-185 can be visible in the light spectrum extending from about 700 nm to about 1 mm or visible in the light spectrum extending from about 10 nm to about 390 nm. In this regard, the optical labels 160, 165 and/or alphanumeric characters/symbols 170-185 need not be visible to the human eye. For instance, the optical labels 160, 165 and/or alphanumeric characters/symbols 170-185 need not be visible in the light spectrum extending from about 390 nm to about 700 nm.

In one arrangement, an image of the optical marker 150 can be provided to the cargo recipient as an electronic file, for example in a portable document format (pdf), and the cargo recipient can print the optical marker 150 using a conventional printer, for example a laser printer. In illustration, the electronic file can be communicated to the cargo recipient using e-mail, text messaging or the like. In another arrangement, the optical marker 150 can be provided to the recipient as a label or sign including an adhesive and/or holes for fasteners to facilitate affixing the optical marker 150 to a suitable surface or post. Regardless, the cargo recipient can have the optical marker 150 affixed to a suitable surface or post at a general location where the cargo 110 is to be delivered in a manner in which the optical marker 150 will be visible to the image capture device 120 of the delivery drone 100. If the alphanumeric characters and/or symbols 180, 185 indicating a specific location where cargo is to be delivered is/are provided on the optical marker 150, the information contained in the alphanumeric characters and/or symbols 180, 185 can be specified by the cargo recipient prior to generation of the optical marker 150.

Figure 2:
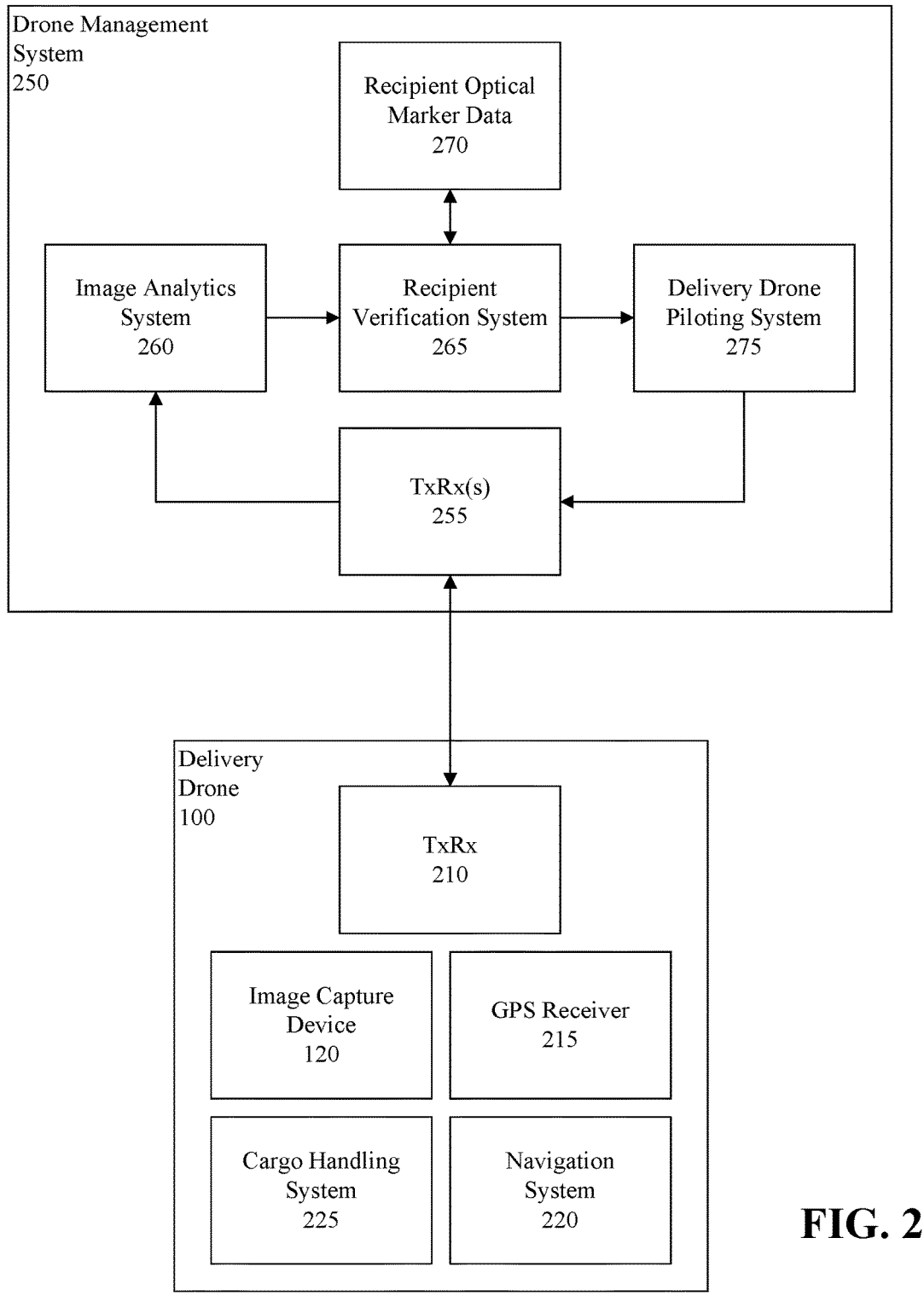
FIG. 2 is a block diagram illustrating an example of a delivery drone system.

FIG. 2 is a block diagram illustrating an example of a delivery drone system 200. The delivery drone system 200 can include the delivery drone 100 and a drone management system 250. In addition to the image capture device 120, the delivery drone 100 also can include at least one RF transceiver 210, a global positioning system (GPS) receiver 215 (or other suitable location positioning system), a navigation system 220 and a cargo handling system 225. The delivery drone 100 also can include one or more gyroscopes (not shown) and/or distance measuring devices, which are known to those skilled in the art. The drone management system 250 can include one or more radio frequency (RF) transceivers 255, an image analytics system 260, a recipient verification system 265, recipient optical marker data 270 and a delivery drone piloting system 275.

The drone management system 250 or another suitable system can generate the recipient optical marker data 270 responsive to information pertaining to the cargo delivery recipient and/or cargo delivery being received from a user or another system. The recipient optical marker data 270 can include, for example, information corresponding to the intended cargo recipient to which the optical label 160 corresponds and/or information corresponding to the particular cargo delivery to which the optical label 165 corresponds. Such information can include, for example, an address of the intended cargo recipient and/or other general location information, contact information for the intended cargo recipient, a tracking number or other unique identifier for the cargo delivery, information related to the sender of the cargo 110, etc. The recipient optical marker data 270 also can include additional information related to the intended cargo recipient, cargo delivery and/or sender of the cargo 110.

The drone management system 250 or another suitable system can generate the information corresponding to the intended cargo recipient and the cargo delivery at any time prior to the cargo being delivered. For example, the information corresponding to the intended cargo recipient can be generated responsive to the intended cargo recipient subscribing to the cargo delivery service, responsive to the intended cargo recipient being scheduled to receive a cargo delivery, etc. The information corresponding to the cargo delivery can be generated, for example, at the time the cargo delivery is scheduled, for instance in response to a tracking number or other unique identifier being assigned to the cargo delivery. In a further example, information included in the recipient optical marker data 270 can be generated responsive to the optical marker 150 being created or responsive to an electronic file (e.g., pdf) for the optical marker 150 being created.

The drone management system 250 and the delivery drone 100 can communicate with one another via the respective transceivers 255, 210, either directly between the transceivers 255, 210 or using a communication network to which the transceivers 255, 210 are communicatively linked. A communication network can be a medium used to provide communications links between the drone management system 250 and the delivery drone 100. The communication network may include connections, such as wireless communication links, wire and/or fiber optic cables. The communication network can be implemented as, or include, any of a variety of different communication technologies such as a WAN, a LAN, a wireless network, a mobile network, a Virtual Private Network (VPN), the Internet, the Public Switched Telephone Network (PSTN), or the like.

The navigation system 220 of the delivery drone 100 can include computer program code executable by a processor of the delivery drone 100 to navigate the delivery drone 100 between a cargo dispatch center and cargo delivery locations. In one arrangement, the navigation system 220 can receive from the drone management system 250 coordinates to where cargo 110 is to be delivered and automatically navigate the delivery drone 100 to the delivery location. For example, the drone management system 250 can communicate the coordinates to the delivery drone 100 via the transceiver 255, and the delivery drone 100 can receive the coordinates via the transceiver 210. In another arrangement, the coordinates can be provided to the delivery drone 100 via a suitable communication port (e.g., a universal serial bus (USB) port) prior to the delivery drone 100 leaving the cargo dispatch center. The navigation system 220 can process GPS data received from the GPS receiver 215 to autonomously navigate the delivery drone 100 to a general location where cargo 110 is to be delivered. It should be noted that the image capture device 120 may capture images prior to arrival at the general location for processing by the image analytics system 260 and/or navigation system 220 while navigating the delivery drone to the general location, and the present arrangements are not limited in this regard.

In another arrangement, the navigation system 220 can receive piloting instructions from the delivery drone piloting system 275 of the drone management system 250. For example, the navigation system 220 can communicate GPS data generated by the GPS receiver 215 to the delivery drone piloting system 275 via the transceiver 210. The drone management system 250 can receive such GPS data via the transceiver 255 and route the GPS data to the delivery drone piloting system 275. The delivery drone piloting system 275 can process the GPS data and, via the transceiver 255, communicate, in real time, navigation commands to the navigation system 220. The delivery drone 100 can receive the navigation commands via the transceiver 210 and, in real time, route the navigation commands to the navigation system 220. Based on the navigation commands, the navigation system 220 can navigate the delivery drone 100 to the general location where the cargo 110 is to be delivered. The navigation commands can be automatically generated by the delivery drone piloting system 275, or can be received from a user of the drone management system 250 (e.g., a pilot) who is tasked with navigating the delivery drone 100 to the general location. Images captured by the image capture device 120 prior to arrival at the general location can be presented to the delivery drone piloting system 275 and/or pilot to facilitate piloting of the delivery drone 100.

Figure 3:
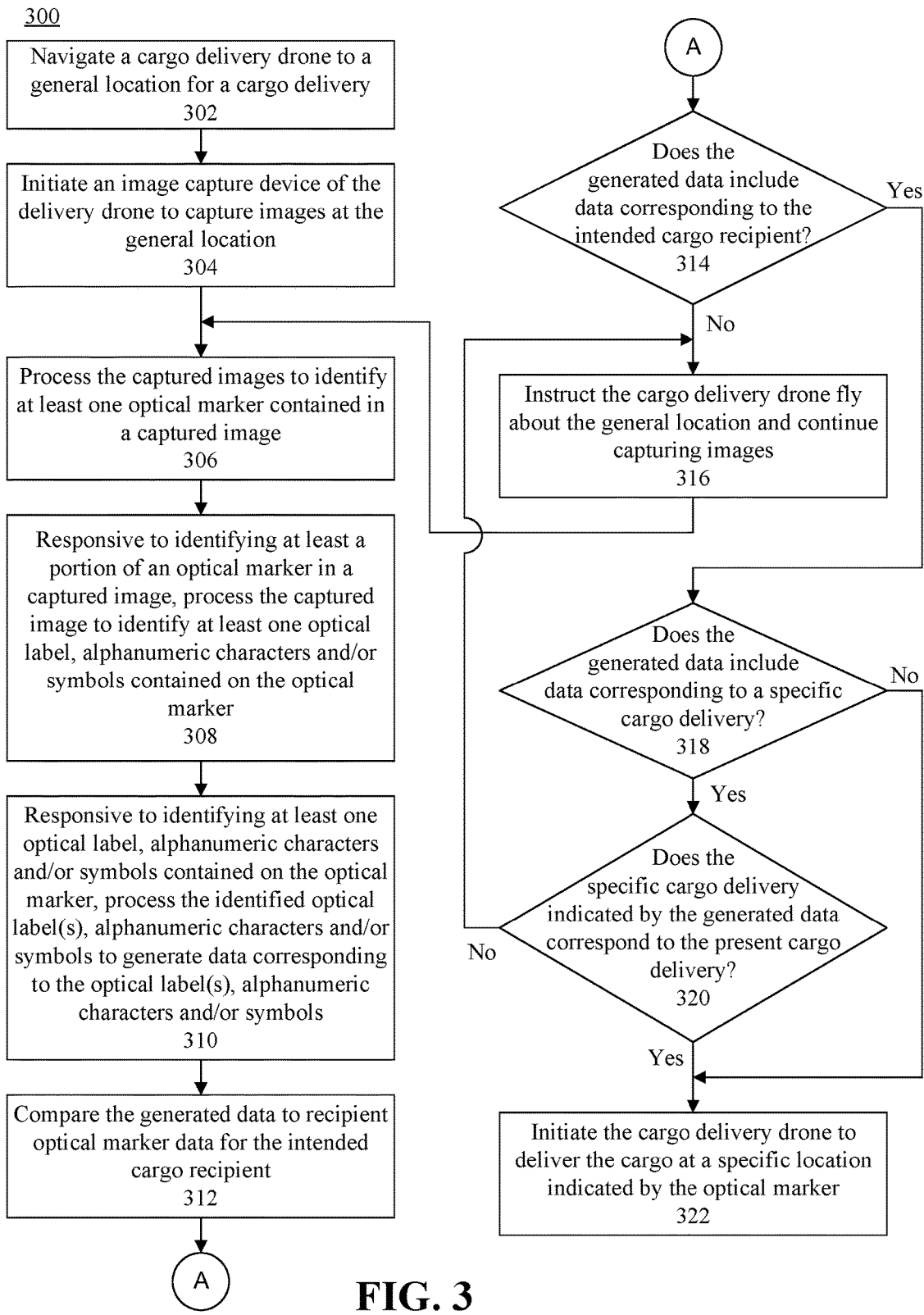
FIG. 3 is a flow chart illustrating an example of a method of delivering cargo.

FIG. 3 is a flow chart illustrating an example of a method 300 of delivering cargo in accordance with the present arrangements. The method 300 can be implemented by the delivery drone system 200 of FIG. 2.

Referring to FIGS. 1, 2 and 3, at step 302 of FIG. 3 the delivery drone piloting system 275 can navigate the delivery drone 100 to the general location where the cargo 110 is to be delivered, for example as described above. At some point the navigation system 220, the delivery drone piloting system 275 and/or pilot can detect, for example based on the GPS data and/or visual images, the delivery drone 100 being present at the general location where the cargo 110 is to be delivered. At step 304, responsive to the navigation system 220, delivery drone piloting system 275 and/or pilot detecting that the delivery drone 100 is present at the general location, the navigation system 220, delivery drone piloting system 275 and/or pilot can initiate, via communications communicated between the transceivers 255, 210, the image capture device 120 to capture images (e.g., still images and or video) at the general location. The image capture device 120 can communicate the captured images, in real time, to the drone management system 250, which can route the captured images to the image analytics system 260, in real time.

At step 306, the image analytics system 260 can process the images in real time to determine whether one or more of the images include at least one optical marker, such as the optical marker 150 of FIG. 1, and, if so, identify the optical marker 150. The image analytics system 260 can use a suitable image processing application, for example a still image and/or video analytics application, which is known in the art, to process the images. At step 308, responsive to the image analytics system 260 determining that one or more of the images include at least a portion of the optical marker 150, the image analytics system 260 can process the captured image(s) to identify at least one optical label, alphanumeric characters and/or symbols contained on the optical marker.

At step 310, responsive identifying at least one optical label, alphanumeric characters and/or symbols contained on the optical marker, the image analytics system 260 can process the identified optical label(s) alphanumeric characters and/or symbols to generate data corresponding to the optical label(s) alphanumeric characters and/or symbols. In illustration, the image analytics system 260 can perform QR code recognition and/or bar code recognition on the optical label(s), optical character recognition on the alphanumeric characters/symbols 170-185, and/or any other form of image data recognition to generate the data. The image analytics system 260 can communicate the data to the recipient verification system 265.

At step 312, the recipient verification system 265 can compare the generated data received from the image analytics system 260 to recipient optical marker data 270 for the intended recipient of the cargo 110. At decision box 314, the recipient verification system 265 can determine whether the generated data includes data corresponding to the intended cargo recipient. In one arrangement, the recipient verification system 265 can determine whether the optical marker 150 includes the optical label 160 and/or optical label 165, and whether the optical label 160 and/or optical label 165 corresponds to the intended cargo recipient. By way of example, the optical label 160 can correspond to the intended cargo recipient if the optical label 160 identifies a cargo recipient that is the intended cargo recipient, or a unique identifier assigned to a cargo recipient that is the intended cargo recipient. The optical label 165 can correspond to the intended cargo recipient if the optical label identifies a cargo delivery (e.g., a cargo delivery tracking number or other unique identifier) assigned to the intended cargo recipient. In another arrangement, the recipient verification system can determine whether the optical marker 150 includes alphanumeric characters 170 identifying a cargo recipient that is the intended cargo recipient, or a unique identifier assigned to a cargo recipient that is the intended cargo recipient.

Responsive to the recipient verification system 265 determining that the generated data does not correspond to the intended cargo recipient, the process can proceed to step 316. At step 316, the delivery drone piloting system 275 can send commands to the navigation system 220 to instruct the navigation system 220 to automatically control the delivery drone 100 to search the general location for additional optical markers. The process then can return to step 306 and continue until another optical marker is identified in the captured images or until the search is considered complete. The search can be considered complete, for example, after a predetermined amount of time has expired, after a predetermined number of navigation movements have been implemented by the delivery drone 100, or after the delivery drone 100 has completed a search of the general location. Since the delivery drone 100 delivers the cargo 110 responsive to an appropriate optical marker 150 being detected, a cargo delivery recipient can abort delivery of the cargo 110 by not displaying the optical marker 150 for detection by the delivery drone 100.

Referring again to decision box 314, responsive to the recipient verification system 265 determining that the generated data does correspond to the intended cargo recipient, the process can proceed to decision box 318. At decision box 318, the recipient verification system 265 can determine whether the generated data includes data corresponding to a specific cargo delivery. In illustration, the recipient verification system 265 can determine whether the optical label 165 indicates a specific cargo deliver (e.g., a specific cargo delivery tracking number or other unique identifier). If the generated data does not include data corresponding to a specific cargo delivery, the process can proceed to step 322.

If the generated data includes data corresponding to a specific cargo delivery, at decision box 320 the recipient verification system 265 can determine whether the specific cargo delivery indicated by the generated data corresponds to the present cargo delivery. In illustration, the recipient verification system can determine whether the optical label 165 indicates a tracking number or other unique identifier assigned to the cargo 110. The tracking number or other unique identifier assigned to the cargo 110 can be indicated in the recipient optical marker data 270. If the specific cargo delivery indicated by the generated data does not correspond to the present cargo delivery, the process can return to step 316 and the delivery drone piloting system 275 can send commands to the navigation system 220 to instruct the navigation system 220 to automatically control the delivery drone 100 to search the general location for additional optical markers. The process can continue at step 306. If, however, the specific cargo delivery indicated by the generated data does correspond to the present cargo delivery, the process can proceed to step 322.

At step 322, the delivery drone piloting system 275 can initiate the delivery drone to the cargo 110 at a specific location indicated by the optical marker 150. In illustration, based on the data generated from the captured image of the optical marker 150, the recipient verification system 265 can determine that the cargo 110 is to be delivered at the specific location where the optical marker is located, within a predetermined distance from the optical marker 150, or at a location indicated by the optical marker 150. Such determination can be made based on information contained in the optical marker 150, for example one or more of the optical labels 160, 165 and/or the alphanumeric characters and/or symbols 180, 185.

By way of example, the recipient verification system 265 can determine whether the optical marker 150 includes alphanumeric characters and/or symbols 180, 185 indicating a specific location where cargo is to be delivered. Responsive to the recipient verification system 265 determining that the optical marker 150 does not include alphanumeric characters and/or symbols 180, 185 indicating a specific location where cargo is to be delivered, the recipient verification system 265 can communicate data to the delivery drone piloting system 275 to cause the delivery drone piloting system 275 to navigate the delivery drone 100 over the optical marker 150 (e.g., if the optical marker 150 is fixed to a floor or ground), or within a predetermined distance of the optical marker 150. Further, the delivery drone piloting system 275 can descend the delivery drone 100 to or near ground/floor level to safely deliver the cargo 110 at the specific location indicated by the optical marker 150 (i.e., the specific location where the optical marker 150 is placed) or within the predetermined distance of the optical marker 150. Responsive to the delivery drown descending to a level where the cargo 110 is on a floor/ground, or within a safe distance to drop the cargo 110 to the ground/floor, the delivery drone piloting system 275 can communicate data to the cargo handling system 225, via the transceivers 255, 210, to cause the cargo support members 135, 140 to release the cargo 110.

Responsive to the recipient verification system 265 determining that the optical marker 150 includes alphanumeric characters and/or symbols 180, 185 indicating a specific location where cargo is to be delivered, the recipient verification system 265 can communicate to the delivery drone piloting system 275 corresponding data, and the delivery drone piloting system 275 can navigate the delivery drone 100 to the specific location indicated by the alphanumeric characters and/or symbols 180, 185 and deliver the cargo 110 to that location. For example, the alphanumeric characters and/or symbols 180, 185 can indicate that the cargo 110 is to be delivered at the specific location where the optical marker 150 is located, and the delivery drone piloting system 275 can navigate the delivery drone 100 to deliver the cargo 110 on or within a predetermined distance of the optical marker 150. In another example, the alphanumeric characters and/or symbols 180, 185 can indicate that the cargo 110 is to be delivered at a specific location that is different than a location where the optical marker 150 is positioned, and the delivery drone piloting system 275 can navigate the delivery drone 100 to deliver the cargo 110 at or within a predetermined distance of the specific location indicated by the alphanumeric characters and/or symbols 180, 185. For instance, the alphanumeric characters and/or symbols 180, 185 can indicate to deliver the cargo 110 fifty feet from the optical marker 150 in a particular direction, and the delivery drone piloting system 275 can navigate the delivery drone 100 to deliver the cargo 110 fifty feet from the optical marker 150 in the particular direction. The delivery drone 100 can use data generated by the GPS receiver 215 and/or an image measuring device (e.g., a laser measuring device) to determine when the delivery drone 100 is at the specified distance from the optical marker 150. In any case, the image analytics system 260 can process images generated by the image capture device 120, in real time, and communicate instructions to the delivery drone piloting system 275 to control the delivery drone 100, in real time, to avoid contact with structures.

Figure 4:
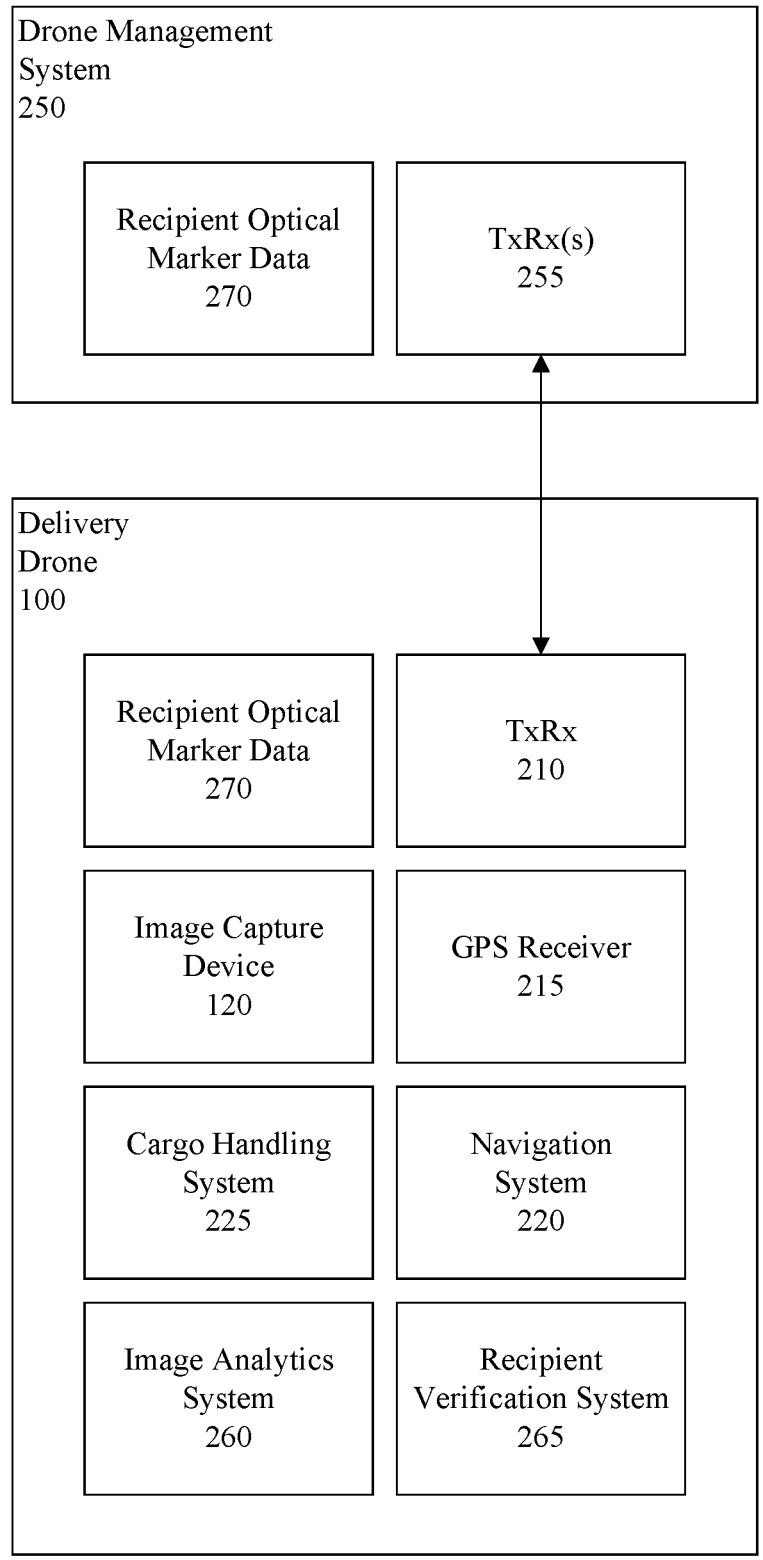
FIG. 4 is a block diagram illustrating another example of a delivery drone system.

FIG. 4 is a block diagram illustrating another example of a delivery drone system 400. The delivery drone system 400 can autonomously implement the method 300 of FIG. 3, including steps 302-312, 316, 322 and decision boxes 314, 318, 320, although certain steps indicated as being performed by the delivery drone piloting system 275 of FIG. 2 can be performed by the navigation system 220 of FIG. 4.

In this example, the image analytics system 260 and/or recipient verification system 265 can be components of the delivery drone 100 rather than the drone management system 250. The delivery drone 100 also can include the image capture device 120, at least one RF transceiver 210, GPS receiver 215 (or other suitable location positioning system), navigation system 220 and cargo handling system 225 previously described.

Further, rather than receiving instructions from the delivery drone piloting system 275, the navigation system 220 can automatically navigate the delivery drone 100. In this regard, the delivery drone 100 can automatically deliver the cargo 110 responsive to the cargo 110 being loaded onto the delivery drone 100 and/or the delivery drone 100 being dispatched to deliver the cargo 110. The delivery drone 100 may periodically communicate with the drone management system 250 to update the drone management system 250 with status updates regarding delivery of the cargo 110 and/or issues encountered regarding delivery of the cargo 110.

By way of example, via the transceiver 255 (or a suitable communication port), the drone management system 250 can communicate to the delivery drone 100 the recipient optical marker data 270 for a cargo delivery, which may include the general location where the cargo 110 is to be delivered, the tracking number or other unique identifier for the cargo delivery, etc. The delivery drone 100 can receive the recipient optical marker data 270 via the transceiver 210 (or a suitable communication port) and store the recipient optical marker data 270 to a computer-readable storage medium of the delivery drone 100. In addition to the recipient optical marker data 270, the drone management system 250 also can communicate to the delivery drone 100 data commanding the delivery drone 100 to deliver the cargo 110 to the cargo recipient.

Responsive to receiving the data commanding the delivery drone 100 to deliver the cargo 110 to the cargo recipient and/or the recipient optical marker data 270, the navigation system 220 can automatically navigate the delivery drone 100 to the general location where the cargo 110 is to be delivered. It should be noted that the image capture device 120 may capture images prior to arrival at the general location for processing by the image analytics system 260 and/or navigation system 220 while navigating the delivery drone 100 to the general location, and the present arrangements are not limited in this regard.

Responsive to the delivery drone 100 arriving at the general location, the recipient verification system 265 can initiate the image capture device 120 to capture images at the general location. The image capture device 120 can communicate the captured images, in real time, to the image analytics system 260. The image analytics system 260 can autonomously perform image processing on the images in real time to determine whether the images include an optical marker, such as the optical marker 150 of FIG. 1. Responsive to the image analytics system 260 determining that the images include an optical marker 150, the image analytics system 260 can autonomously perform image processing on the images to determine information contained in the optical marker 150 and communicate such information in real time to the recipient verification system 265.

The recipient verification system 265 can autonomously compare the data represented by the optical label 160 and/or optical label 165 to recipient the optical marker data 270 for the intended cargo recipient, and autonomously determine whether the data presented by the optical label 160 and/or optical label 165 corresponds to the recipient optical marker data 270 for the intended cargo recipient. Responsive to autonomously determining that the data represented by the optical label 160 and/or optical label 165 corresponds to the recipient optical marker data 270 for the intended cargo recipient, the recipient verification system 265 can, in real time, determine that the delivery drone 100 is at the appropriate general location. Responsive to the data represented by the optical label 160 and/or optical label 165 not corresponding to the recipient optical marker data 270 for the intended cargo recipient, the recipient verification system 265 can determine, in real time, the optical marker is not the appropriate optical marker 150 for the cargo delivery.

Responsive to the recipient verification system 265 determining that an optical marker is not the appropriate optical marker 150 for the cargo delivery, in one arrangement, the navigation system 220 can automatically control the delivery drone 100 to search the general location for additional optical markers or to return to the cargo dispatch center. In another arrangement, the navigation system 220 can automatically control the delivery drone 100 to search the general location for additional optical markers and return to the cargo dispatch center if no such optical markers are discovered within a predetermined amount of time or after a predetermined number of navigation movements have been implemented. In the case that the delivery drone 100 searches for additional optical markers, the image analytics system 260 can continue processing images captured by the image capture device 120, in real time, to determine whether images captured contain one or more additional optical markers.

Responsive to the recipient verification system 265 determining that an optical marker 150 which corresponds to the cargo recipient and/or the specific cargo delivery is identified in an image captured by the image capture device 120, the recipient verification system 265 can process data presented by the optical marker 150 to determine where the cargo 110 is to be delivered. For example, the recipient verification system 265 can determine that the cargo 110 is to be delivered at the specific location where the optical marker 150 is located, within a predetermined distance from the optical marker 150, or at a location indicated by the optical marker 150. As noted, such determination can be made based on information contained in the optical marker 150, for example one or more of the optical labels 160, 165 and/or the alphanumeric characters and/or symbols 180, 185. If the optical marker 150 includes alphanumeric characters and/or symbols 180, 185 indicating a specific location where cargo is to be delivered, the delivery drone piloting system 275 can navigate the delivery drone 100 to the specific location indicated by the alphanumeric characters and/or symbols 180, 185 and deliver the cargo 110 to that location, for example as previously described.

Figure 5:
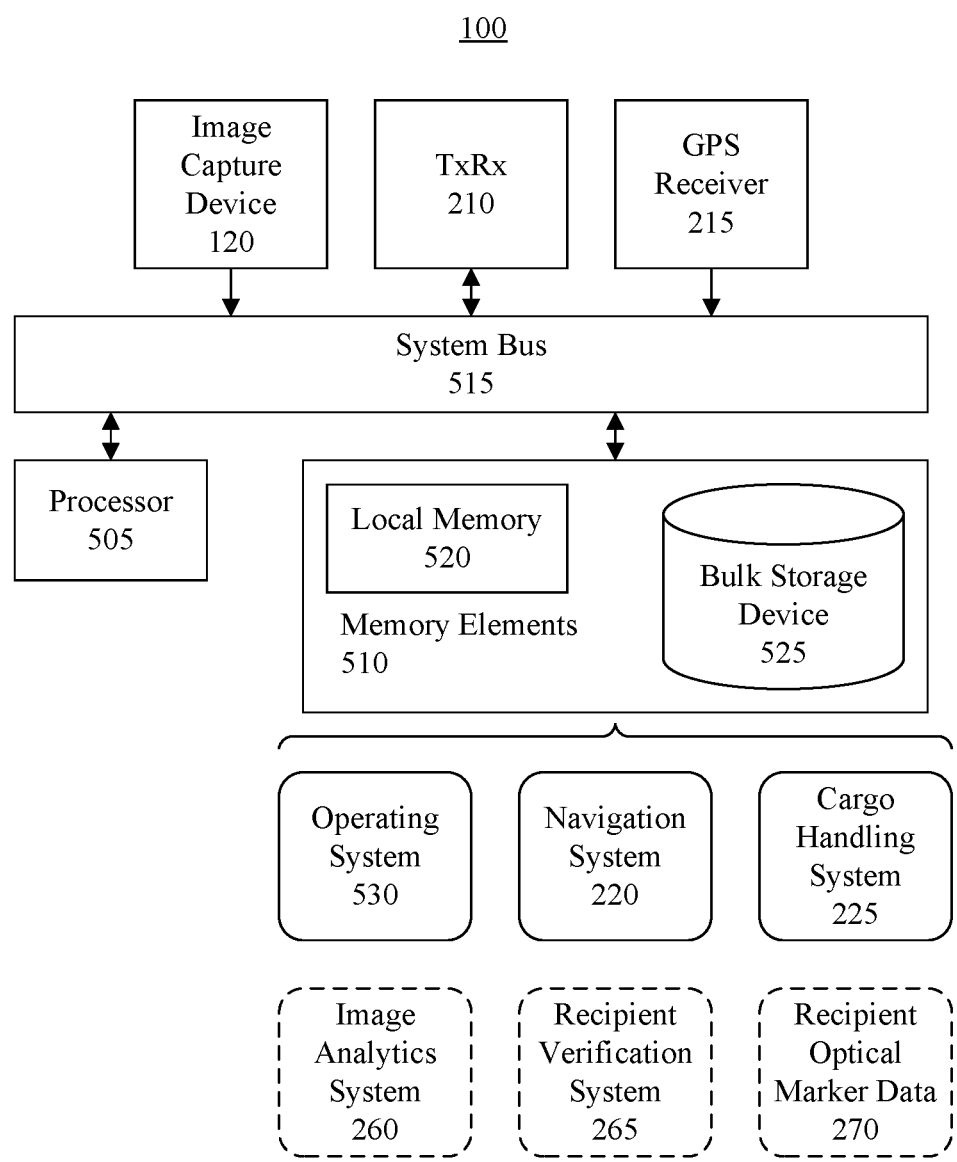
FIG. 5 is a block diagram illustrating example data processing architecture for a delivery drone.

FIG. 5 is a block diagram illustrating example data processing architecture for the delivery drone 100 in accordance with one arrangement disclosed within this specification. The delivery drone 100 can include at least one processor 505 (e.g., a central processing unit) coupled to memory elements 510 through a system bus 515 or other suitable circuitry. As such, the delivery drone 100 can store program code within the memory elements 510. The processor 505 can execute the program code accessed from the memory elements 510 via the system bus 515. It should be appreciated that the delivery drone 100 can be implemented to include any data processing system including a processor and memory that is capable of controlling the delivery drone 100 to perform the functions and/or operations described within this specification that are performed by the delivery drone 100.

The memory elements 510 can include one or more physical memory devices such as, for example, local memory 520 and one or more bulk storage devices 525. Local memory 520 refers to random access memory (RAM) or other non-persistent memory device(s) generally used during actual execution of the program code. The bulk storage device(s) 525 can be implemented as a hard disk drive (HDD), solid state drive (SSD), or other persistent data storage device. The delivery drone 100 also can include one or more cache memories (not shown) that provide temporary storage of at least some program code in order to reduce the number of times program code must be retrieved from the bulk storage device 525 during execution.

The image capture device 120, transceiver 210 and GPS receiver 125, which were previously described, can be integrated with or otherwise coupled to the delivery drone 100. Such devices can be integrated with or otherwise coupled to the delivery drone 100 either directly or through intervening I/O controllers.

As pictured in FIG. 5, the memory elements 510 can store the components of the delivery drone 100, namely an operating system 530, the navigation system 220 and the cargo handling system 225. Being implemented in the form of executable program code, the operating system 530, navigation system 220 and cargo handling system 225 can be executed by the processor 505 of the delivery drone 100. For example, the navigation system 220 and cargo handling system 225 can be executed in a computing environment provided by the operating system 530. As such, the navigation system 220 and cargo handling system 225 are functional data structures that impart functionality when employed as part of the delivery drone 100.

In one arrangement, the memory elements 510 also can store the image analytics system 260, the recipient verification system 265 and the recipient optical marker data 270 depicted in FIG. 4. In such arrangement, the image analytics system 260 and recipient verification system 265 can be executed in the computing environment provided by the operating system 530. Further, the recipient optical marker data 270 can be accessed by the processor 505 for processing as previously described. Accordingly, the image analytics system 260, the recipient verification system 265 and the recipient optical marker data 270 are functional data structures that impart functionality when employed as part of the delivery drone 100.

Figure 6:
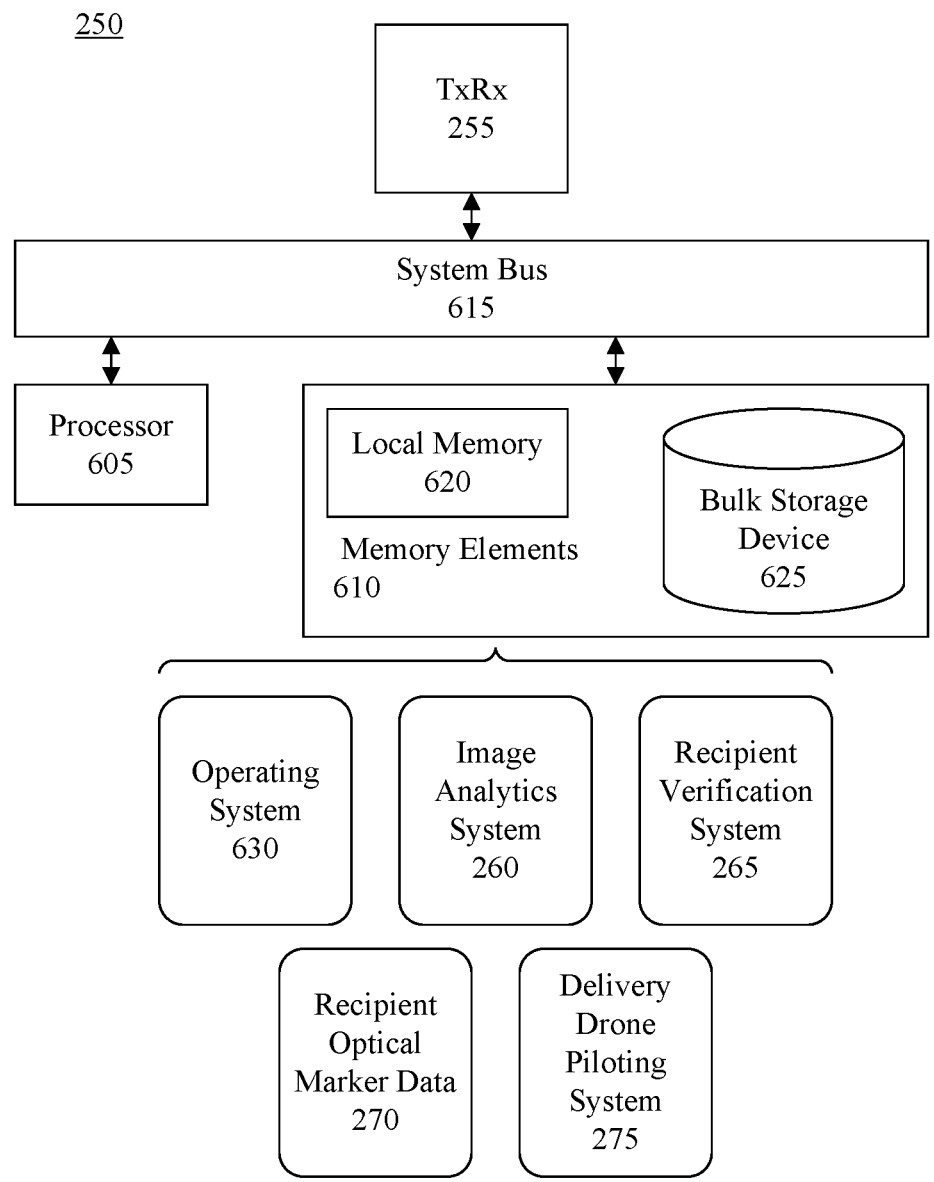
FIG. 6 is a block diagram illustrating example data processing architecture for a drone management system.

FIG. 6 is a block diagram illustrating example data processing architecture for a drone management system 250. The drone management system 250 can include at least one processor 605 (e.g., a central processing unit) coupled to memory elements 610 through a system bus 615 or other suitable circuitry. As such, the drone management system 250 can store program code within the memory elements 610. The processor 605 can execute the program code accessed from the memory elements 610 via the system bus 615. It should be appreciated that the drone management system 250 can be implemented in the form of any system including a processor and memory that is capable of performing the functions and/or operations described within this specification performed by the drone management system 250. For example, the drone management system 250 can be implemented as a server, a plurality of communicatively linked servers, a workstation, a desktop computer, a mobile computer, a tablet computer, a laptop computer, a netbook computer, a smart phone, a personal digital assistant, a network appliance, and so on.

The memory elements 610 can include one or more physical memory devices such as, for example, local memory 620 and one or more bulk storage devices 625. Local memory 620 refers to RAM or other non-persistent memory device(s) generally used during actual execution of the program code. The bulk storage device(s) 625 can be implemented as a HDD, SSD, or other persistent data storage device. The drone management system 250 also can include one or more cache memories (not shown) that provide temporary storage of at least some program code in order to reduce the number of times program code must be retrieved from the bulk storage device 625 during execution.

The transceiver 255 can be integrated with or otherwise coupled to the drone management system 250 either directly or through intervening I/O controllers. For example the transceiver 255 can be communicatively linked to the drone management system 250 via one or more communication networks to which a network adapter (not shown) of the drone management system 250 is communicatively linked.

As pictured in FIG. 6, the memory elements 610 can store the components of the drone management system 250, namely an operating system 630, the image analytics system 260, the recipient verification system 265, the recipient optical marker data 270 and the delivery drone piloting system 275. Being implemented in the form of executable program code, the operating system 630, image analytics system 260, recipient verification system 265, and delivery drone piloting system 275 can be executed by the drone management system 250 and, as such, can be considered part of the drone management system 250. Further, the recipient optical marker data 270 can be accessed by the processor 605 for processing. Thus, the operating system 630, image analytics system 260, recipient verification system 265, recipient optical marker data 270 and delivery drone piloting system 275 are functional data structures that impart functionality when employed as part of the drone management system 250.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising: processing at least one image captured by an image capture device of a delivery drone to identify at least one optical marker contained in the image, the optical marker displaying at least one machine readable optical label, or alphanumeric characters, indicating a cargo recipient; responsive to identifying the optical marker contained in the image, performing, using a processor, image processing on the image to generate data corresponding to the machine readable optical label or alphanumeric characters; determining whether the data corresponding to the machine readable optical label or alphanumeric characters corresponds to an intended cargo recipient of a cargo being carried by the delivery drone; and responsive to determining that the data corresponding to the machine readable optical label or alphanumeric characters corresponds to the intended cargo recipient of the cargo being carried by the delivery drone, determining a first specific location at a general location by processing the image, wherein the optical marker indicates the first specific location and the first specific location is different than a second specific location where the optical marker is positioned at the general location, and initiating the delivery drone to deliver the cargo at the first specific location indicated by the optical marker.

2. The method of claim 1, wherein the at least one machine readable optical label is a quick response code.

3. The method of claim 1, wherein the at least one machine readable optical label is a bar code.

4. The method of claim 1, wherein performing, using the processor, image processing on the image to generate data corresponding to the machine readable optical label or alphanumeric characters is autonomously performed by the delivery drone.

5. The method of claim 1, wherein determining whether the data corresponding to the machine readable optical label or alphanumeric characters corresponds to the intended cargo recipient of the cargo being carried by the delivery drone is autonomously performed by the delivery drone.

6. The method of claim 1, further comprising:
autonomously capturing, by the image capture device of the delivery drone, the at least one image.

7. A system, comprising: a processor programmed to initiate executable operations comprising: processing at least one image captured by an image capture device of a delivery drone to identify at least one optical marker contained in the image, the optical marker displaying at least one machine readable optical label, or alphanumeric characters, indicating a cargo recipient; responsive to identifying the optical marker contained in the image, performing image processing on the image to generate data corresponding to the machine readable optical label or alphanumeric characters; determining whether the data corresponding to the machine readable optical label or alphanumeric characters corresponds to an intended cargo recipient of a cargo being carried by the delivery drone; and responsive to determining that the data corresponding to the machine readable optical label or alphanumeric characters corresponds to the intended cargo recipient of the cargo being carried by the delivery drone, determining a first specific location at a general location by processing the image, wherein the optical marker indicates the first specific location and the first specific location is different than a second specific location where the optical marker is positioned at the general location, and initiating the delivery drone to deliver the cargo at the first specific location indicated by the optical marker.

8. The system of claim 7, wherein the at least one machine readable optical label is a quick response code.

9. The system of claim 7, wherein the at least one machine readable optical label is a bar code.

10. The system of claim 7, wherein performing image processing on the image to generate data corresponding to the machine readable optical label or alphanumeric characters is autonomously performed by the delivery drone.

11. The system of claim 7, wherein determining whether the data corresponding to the machine readable optical label or alphanumeric characters corresponds to the intended cargo recipient of the cargo being carried by the delivery drone is autonomously performed by the delivery drone.

12. The system of claim 7, the executable operations further comprising:
autonomously capturing, by the image capture device of the delivery drone, the at least one image.

13. A computer program product comprising a computer readable storage medium having program code stored thereon, the program code executable by a processor to perform a method comprising: processing, by the processor, at least one image captured by an image capture device of a delivery drone to identify at least one optical marker contained in the image, the optical marker displaying at least one machine readable optical label, or alphanumeric characters, indicating a cargo recipient; responsive to identifying the optical marker contained in the image, performing, by the processor, image processing on the image to generate data corresponding to the machine readable optical label or alphanumeric characters; determining, by the processor, whether the data corresponding to the machine readable optical label or alphanumeric characters corresponds to an intended cargo recipient of a cargo being carried by the delivery drone; and responsive to determining that the data corresponding to the machine readable optical label or alphanumeric characters corresponds to the intended cargo recipient of the cargo being carried by the delivery drone, determining a first specific location at a general location by processing the image, wherein the optical marker indicates the first specific location and the first specific location is different than a second specific location where the optical marker is positioned at the general location, and initiating the delivery drone to deliver the cargo at the first specific location indicated by the optical marker.

14. The computer program product of claim 13, wherein the at least one machine readable optical label is a quick response code.

15. The computer program product of claim 13, wherein the at least one machine readable optical label is a bar code.

16. The computer program product of claim 13, wherein performing, using the processor, image processing on the image to generate data corresponding to the machine readable optical label or alphanumeric characters is autonomously performed by the delivery drone.

17. The computer program product of claim 13, wherein determining whether the data corresponding to the machine readable optical label or alphanumeric characters corresponds to the intended cargo recipient of the cargo being carried by the delivery drone is autonomously performed by the delivery drone.

18. The computer program product of claim 13, the method further comprising:

autonomously capturing, by the image capture device of the delivery drone, the at least one image.

\* \* \* \* \*